Patented Nov. 12, 1940

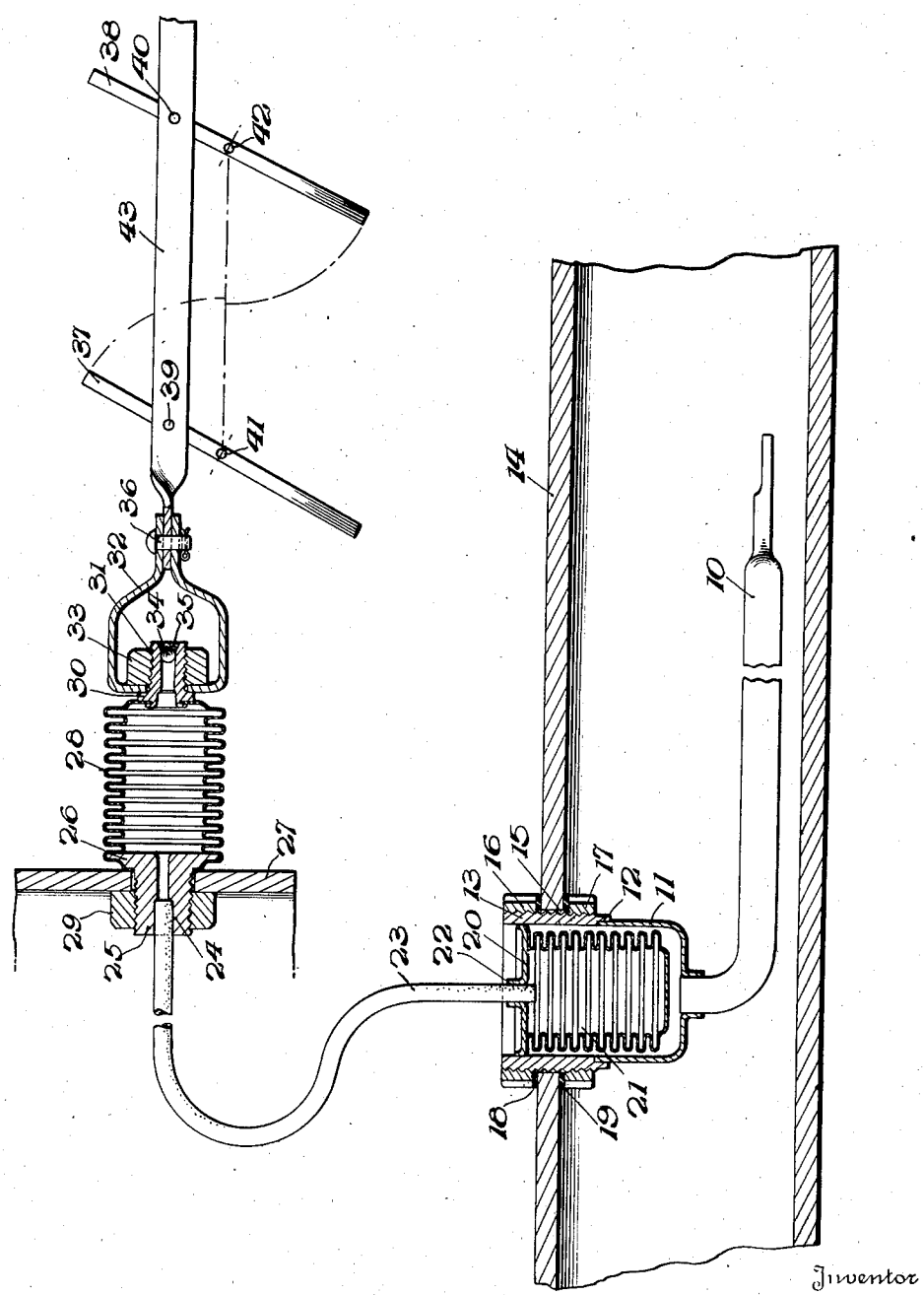

2,221,347

UNITED STATES PATENT OFFICE 2,221,347

THERMOSTATIC LIQUID TRANSMISSION SYSTEM

Jean V. Giesler, Knoxville, Tenn., assignor to The Fulton Sylphon Company, Knoxville, Tenn., a corporation of Delaware Application December 27, 1937, Serial No. 181,904

1 Claim. (Cl. 236—35)

This invention relates to thermostatic liquid transmission systems for the control of mechanical devices. More particularly this invention relates to thermostatic liquid transmission systems in which the expansion of a substance at its melting point is used to obtain thermostatic operation of mechanical devices. Still more particularly this invention relates to thermostatic liquid transmission systems in which the expansion of a substance at its melting point is transmitted through the medium of a liquid to operate mechanical devices.

Heretofore thermostatic devices responsive to variations in temperature have been used with mechanical means such as bell crank levers, push rods, gear trains and the like to open and close valves and operate other mechanisms, but difficulties have been experienced where such mechanical means are employed to transmit the movement of a thermostatic element to a device to be controlled which is disposed at a relatively remote position from said thermostatic element. The present invention has for its object to eliminate these difficulties by using a liquid which is substantially incompressible as the transmitting medium in combination with novel thermostatic means for obtaining the desired displacement which is to be transmitted by said liquid.

Another object of this invention is to provide a novel liquid transmission for use in combination with thermostatic means actuated by a substance expanding at its melting point.

Another object of this invention is to provide a novel thermostatic means in which a substance expanding at its melting point is used in combination with a liquid transmission to operate a relatively remote mechanical device.

Another object of this invention is to provide a novel thermostatic means having provision for conducting heat into a substance expanding at its melting point.

Other and further objects of the present invention will appear as the description thereof proceeds.

In the accompanying figure one embodiment of the present invention is shown as applied to the operation of radiator shutters on automobiles, but this embodiment is not to be construed as a limitation on the present invention, reference being had to the appended claim for this purpose.

In the accompanying figure, 10 is a bulb secured in any suitable way, as by brazing, to a casing 11 which is in turn suitably secured at 12, as by brazing, to a hollow externally threaded body member 13 which with said casing 11 constitutes a housing. Bulb 10, casing 11 and part of body member 13 are subjected to the source of heat, here being shown as carried within a hose or pipe 14 which may be a part of the water line of an automobile cooling system, said body member 13 extending through a suitable aperture 15 in said hose or pipe 14 and being rigidly secured thereto and forming a fluid tight joint therewith by clamp nuts 16 and 17 threaded on body member 13 and acting in conjunction with washers 18 and 19. Hose or pipe 14 for example may connect the outlet of the cooling jacket of the engine (not shown) with the inlet to the radiator (not shown).

Closing the open end of body member 13 is head 20 suitably secured to body member 13, as by soldering or brazing. Within casing 11 and body member 13 and secured to head 20 in any suitable way is an expansible and collapsible vessel 21 preferably constructed of corrugated resilient metal. Head 20 is provided with a suitable aperture 22 in which a tube 23 is suitably secured. Secured to the other end of tube 23, as at 24, is an internally bored and externally threaded fitting 25 having formed thereon a head 26. Mounted on head 26 of fitting 25 is an expansible and collapsible vessel 28 preferably constructed of corrugated resilient metal. Fitting 25 is held in place in any suitable way as on a bracket 27 by a lock nut 29 threaded on fitting 25. Vessel 28 is provided at its opposite end with an internally bored end fitting 30 having a threaded portion 31. A suitable connector 32 is secured to said end fitting 30 by nut 33 threaded thereon. End fitting 30 is closed by any suitable means here shown as a ball 34 driven into the internal bore and suitably held in place as by soldering at 35. Attached to connector 32 as by pin 36 is a suitable push rod 43 designed to operate radiator shutter elements, two of which are shown at 37 and 38, and pivotally attached thereto at 39 and 40, respectively, said shutter elements 37 and 38 being pivotally mounted at 41 and 42, respectively.

Bulb 10 and the portion of casing 11 and body member 13 around the vessel 21 is filled with any suitable substance expanding at its melting point, such as beeswax, carnauba wax, diphenyl or any suitable mixture thereof. To insure the rapid transmission of heat through this expanding substance, a heat conducting material such as copper preferably in comminuted form is mixed therewith, causing the expanding substance to melt more quickly. If the space between the vessel 21 and the casing 11 and body member 13 is not completely filled with the expanding substance any air remaining therein is removed and the space filled with some liquid in which the expanding substance is not soluble.

The fluid transmission system including the vessel 21, tube 23, and vessel 28 is filled with any suitable liquid such as kerosene, turpentine or other suitable mixture by exhausting the system with a vacuum pump and then introducing the desired quantity of the liquid through the end fitting 30, after which the ball 34 is driven tight into the end fitting 30 and soldered at 35 to secure it in place and prevent the escape of liquid.

With the above described embodiment of the novel thermostatic liquid transmission system of the present invention installed for radiator shutter operation in an automobile and suitably adjusted, when the engine of the automobile is started the cooling liquid is pumped through hose or pipe 14 past bulb 10, casing 11, and body member 13 from the cooling jacket of the engine to the inlet of the radiator. When the engine is cold the cooling liquid will be cold, the expanding substance in bulb 10, casing 11, and body member 13 will be in its solid and contracted form, vessel 21 will be in its expanded form drawing the liquid in the transmission system thereinto so that the vessel 28 is in its collapsed condition, and push rod 43 is drawn to the left in the figure rotating shutter elements 37 and 38 in a counter-clockwise direction about pivots 41 and 42, respectively, to cut off the passage of cooling air through the radiator. As the engine continues to run the cooling liquid will be heated and raised in temperature as the radiator exerts little cooling effect with shutters 37 and 38 closed. Increase in temperature of the cooling liquid will be rapidly transmitted through the expanding substance in bulb 10, casing 11 and body member 13 due to the heat conducting material mixed therewith until the melting temperature of the expanding substance is reached. When the melting temperature of the expanding substance is reached the expanding substance increases in volume and forces vessel 21 to collapse. As vessel 21 collapses the liquid therein is forced through tube 23 into vessel 28 and expands vessel 28. Expansion of vessel 28 forces push rod 43 to the right in the figure, rotating shutter elements 37 and 38 in a clockwise direction about pivots 41 and 42, respectively, and allowing cooling air to pass through the radiator and cool the cooling liquid.

If for any reason the cooling liquid flowing through hose or pipe 14 drops in temperature below the melting point of the expanding substance in bulb 10, casing 11 and body member 13 the expanding substance will solidify with consequent reduction in volume allowing vessel 21 to expand under its own resiliency, although a spring may be used therewith if preferred, and draw the liquid from vessel 28. Vessel 28 will then collapse under its own resiliency, although a spring may be used therewith if preferred, and move push rod 43 to the left in the figure and close shutter elements 37 and 38 until the cooling liquid again reaches the melting temperature of the expanding substance.

It is now apparent that the present invention provides a novel thermostatic liquid transmission system such as is suitable for a radiator shutter control in automobiles, as well as for other purposes, in which novel means are provided for employing a substance expanding at its melting point and which is used with a novel liquid transmission to operate the mechanical devices to be controlled.

To those skilled in the art changes in or modifications of the above described embodiment of the present invention will now be suggested without departing from the inventive concept. For example, vessel 21 might be omitted and the liquid in the transmission system be allowed to directly contact the expanding substance if not a solvent thereof. Therefore, to determine the scope of the present invention reference should be had to the appended claim.

What is claimed is:

In a thermostatically-actuated remote-control device for operating automobile shutters or the like to position the same as determined by the temperature of the cooling medium of the cooling system at a point relatively remote from the shutters, a temperature responsive unit adapted to be installed in a conduit for conveying cooling medium, said unit including a cup-shaped wall whose interior is subdivided into inner and outer chambers by a corrugated expansible and collapsible tubular metal wall disposed telescopically within said cup-shaped wall and an elongated extension projecting from said cup-shaped wall and having its interior in communication with the outer of said chambers and constituting an extension thereof, said unit adapted to be mounted for subjection to the cooling medium in said conduit with said outer chamber substantially surrounded and said extension entirely surrounded by said cooling medium, said outer chamber and its extension being charged with a material which is normally solid at atmospheric temperature but which melts and expands at the temperature at which control of the shutters is to be assumed, a fluid transmission system for transmitting the movements of said corrugated wall effected by the expansion and contraction of said charge, said system including the inner of said foregoing chambers, an elongated tube in communication with said inner chamber, and a second expansible and collapsible corrugated tubular metal wall providing a second expansible and collapsible chamber adapted to be mounted adjacent the automobile radiator and in communication with said tube, said inner chamber, said tube and said last named expansible and collapsible chamber being filled with a liquid for expanding and contracting said second named expansible and collapsible chamber as said inner chamber is operated by said charge, and means for directly operating shutters mounted on the movable wall of said second named expansible and collapsible chamber and adapted to be directly connected with the shutters.

JEAN V. GIESLER.